(12) United States Patent
Kirtley et al.

(10) Patent No.: US 9,765,699 B2
(45) Date of Patent: Sep. 19, 2017

(54) GAS TURBINE SEALING

(71) Applicant: General Electric Company, Schenectady, NY (US)

(72) Inventors: Kevin Richard Kirtley, Simpsonville, SC (US); David Richard Johns, Simpsonville, SC (US); Andrew Paul Giametta, Greenville, SC (US); Richard William Johnson, Greer, SC (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 14/585,871

(22) Filed: Dec. 30, 2014

(65) Prior Publication Data

US 2016/0186664 A1 Jun. 30, 2016

(51) Int. Cl.
| | | |
|---|---|---|
| *F02C 7/28* | (2006.01) | |
| *F02C 7/18* | (2006.01) | |
| *F01D 11/04* | (2006.01) | |
| *F01D 5/08* | (2006.01) | |
| *F01D 11/00* | (2006.01) | |

(52) U.S. Cl.
CPC .............. *F02C 7/28* (2013.01); *F01D 5/081* (2013.01); *F01D 11/001* (2013.01); *F01D 11/04* (2013.01); *F02C 7/18* (2013.01); *F05D 2240/127* (2013.01); *F05D 2240/81* (2013.01)

(58) Field of Classification Search
CPC ........ F01D 5/081; F01D 11/001; F01D 11/04; F02C 7/18; F02C 7/28; F05D 2240/127; F05D 2240/81
See application file for complete search history.

(56) References Cited

U.S. PATENT DOCUMENTS

| | | | | |
|---|---|---|---|---|
| 5,197,852 A | * | 3/1993 | Walker | F01D 5/00 415/115 |
| 5,440,874 A | * | 8/1995 | Charier | F01D 5/081 415/115 |
| 6,481,959 B1 | | 11/2002 | Morris et al. | |
| 6,761,529 B2 | * | 7/2004 | Soechting | F01D 5/187 415/115 |
| 7,114,339 B2 | | 10/2006 | Alvanos et al. | |
| 8,011,881 B1 | * | 9/2011 | Liang | F01D 5/187 415/115 |
| 8,277,177 B2 | | 10/2012 | Liang | |

(Continued)

*Primary Examiner* — Igor Kershteyn
(74) *Attorney, Agent, or Firm* — Mark E. Henderson; Ernest G. Cusick; Frank A. Landgraff

(57) ABSTRACT

A gas turbine engine having a turbine that includes a stator blade and a rotor blade having a seal formed in a trench cavity defined therebetween. The seal may include: a stator overhang extending from the stator blade toward the rotor blade so to include an overhang topside, and, opposite the overhang topside, an overhang underside; a rotor outboard face extending radially inboard from a platform edge, the rotor outboard face opposing at least a portion of the overhang face across the axial gap of the trench cavity; an axial projection extending from the rotor outboard face toward the stator blade so to axially overlap with the stator overhang; and an interior cooling channel extending through the stator overhang to a port formed through the overhang underside. The port may be configured to direct a coolant expelled therefrom toward the axial projection.

17 Claims, 10 Drawing Sheets

(56) References Cited

U.S. PATENT DOCUMENTS

| | | |
|---|---|---|
| 8,317,465 B2 | 11/2012 | Smith |
| 8,616,832 B2 | 12/2013 | Smoke et al. |
| 2010/0008760 A1* | 1/2010 | Morris .................... F01D 5/145 |
| | | 415/115 |
| 2011/0129342 A1 | 6/2011 | Smoke et al. |
| 2014/0037435 A1* | 2/2014 | Porter .................... F01D 5/081 |
| | | 415/173.7 |

* cited by examiner

GAS TURBINE SEALING

BACKGROUND OF THE INVENTION

The present invention relates generally to combustion gas turbine engines ("gas turbines"), and more specifically to a rim cavity sealing systems and processes for the gas turbine engines.

During operation, because of the extreme temperatures of the hot-gas path, great care is taken to prevent components from reaching temperatures that would damage or degrade their operation or performance. One area that is particularly sensitive to extreme temperatures is the space that is inboard of the hot-gas path. This area, which is often referred to as the inner wheelspace or rim cavity of the turbine, contains the several turbine wheels or rotors onto which the rotating rotor blades are attached. While the rotor blades are designed to withstand the high temperatures of the hot-gas path, the rotors are not and, thus, it is necessary that the working fluid of the hot-gas path be prevented from flowing into the rim cavity. However, as will be appreciated, axial gaps necessarily exist between the rotating blades and the surrounding stationary parts, and it is through these gaps that the hot gases of the working fluid gains access to the internal regions. In addition, because of the way the engine warms up and differing thermal expansion coefficients, these gaps may widen and shrink depending on the way the engine is being operated. This variability in size makes the proper sealing of these gaps a difficult design challenge.

More specifically, gas turbines includes a turbine section with multiple rows of stator blades and rotor blades in which the stages of rotor blades rotate together around the stationary guide vanes of the stator blades. The stator blades and assemblies related thereto extend into a rim cavity formed between two stages of the rotor blades. Seals are formed between the inner shrouds of the rotor blades and the stator blades, and between the inboard surface of the stator blade diaphragm and the two rotor disk rim extensions. As will be appreciated, the hot gas flow pressure is higher on the forward side of the stator blades than on the aft side, and thus a pressure differential exists within the rim cavity. In the prior art, seals on the inboard surface of the stator diaphragm may be used to control of leakage flow across the row of stator blades. Additionally, knife edge seals may be used on the stator blade cover plate to produce a seal against the hot gas ingestion into the rim cavity. Hot gas ingestion into the rim cavity is prevented as much as possible because the rotor disks are made of relatively low temperature material than the airfoils. The high stresses operating on the rotor disks along with exposure to high temperatures will thermally weaken the rotor disk and shorten the life thereof. Purge cooling air discharge from the stator diaphragm has been used to purge the rim cavity of hot gas flow ingestion.

However, very little progress has been made in the control of rim cavity leakage flow so to reduce the usage of purge air. Difficulties regarding distribution of purge are result in inefficient usage, which, of course, comes at a cost. As will be appreciated, purging systems increase the manufacturing and maintenance cost of the engine, and are often inaccurate in terms of maintaining a desired level of pressure or outflow from the rim cavity. Further, purge flows adversely affect the performance and efficiency of the turbine engine. That is, increased levels of purge air reduce the output and efficiency of the engine. Hence, it is desirable that the usage of purge air be minimized. As a result, there is a continuing need for improved methods, systems and/or apparatus that better seal the gaps, trench cavities, and/or rim cavities from the hot gases of the flow path.

BRIEF DESCRIPTION OF THE INVENTION

The present application thus describes a gas turbine engine having a turbine that includes a stator blade and a rotor blade having a seal formed in a trench cavity formed therebetween. The trench cavity is an axial gap defined between opposing inboard faces of the stator blade and rotor blade. The seal may include: a stator overhang extending from the stator blade toward the rotor blade so to include an overhang topside that defines a portion of the inner boundary of the flowpath, and, opposite the overhang topside, an overhang underside; a rotor outboard face extending radially inboard from a platform edge, the rotor outboard face opposing at least a portion of the overhang face across the axial gap of the trench cavity; an axial projection extending from the rotor outboard face toward the stator blade so to axially overlap with the stator overhang; and an interior cooling channel extending through the stator overhang to a port formed through the overhang underside. The port may be configured to direct a coolant expelled therefrom toward the axial projection and may be configured to direct coolant in the rotational directions.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
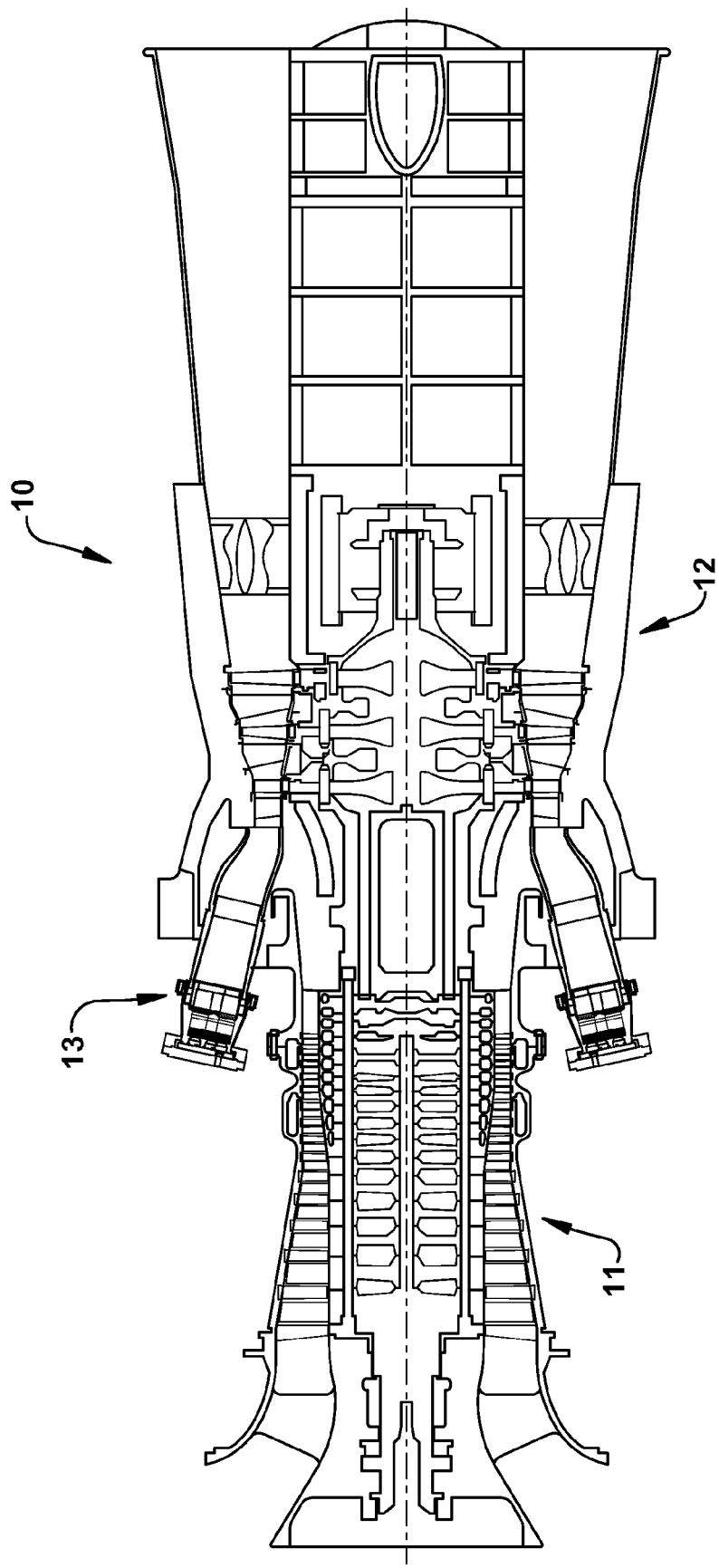
FIG. 1 is a schematic representation of an exemplary turbine engine in which blade assemblies according to embodiments of the present application may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to a certain type of turbine engine, the technology of the present invention also may be applicable to other types of turbine engines as would the understood by a person of ordinary skill in the relevant technological arts.

Given the nature of turbine engine operation, several descriptive terms may be used throughout this application so to explain the functioning of the engine and/or the several sub-systems or components included therewithin, and it may prove beneficial to define these terms at the onset of this section. Accordingly, these terms and their definitions, unless stated otherwise, are as follows. The terms "forward" and "aft", without further specificity, refer to directions relative to the orientation of the gas turbine. That is, "forward" refers to the forward or compressor end of the engine, and "aft" refers to the aft or turbine end of the engine. It will be appreciated that each of these terms may be used to indicate movement or relative position within the engine. The terms "downstream" and "upstream" are used to indicate position within a specified conduit relative to the general direction of flow moving through it. (It will be appreciated that these terms reference a direction relative to an expected flow during normal operation, which should be plainly apparent to anyone of ordinary skill in the art.) The term "downstream" refers to the direction in which the fluid is flowing through the specified conduit, while "upstream" refers to the direction opposite that. Thus, for example, the primary flow of working fluid through a turbine engine, which beings as air moving through the compressor and then becomes combustion gases within the combustor and beyond, may be described as beginning at an upstream location toward an upstream or forward end of the compressor and terminating at an downstream location toward a downstream or aft end of the turbine. In regard to describing the direction of flow within a common type of combustor, as discussed in more detail below, it will be appreciated that compressor discharge air typically enters the combustor through impingement ports that are concentrated toward the aft end of the combustor (relative to the combustors longitudinal axis and the aforementioned compressor/turbine positioning defining forward/aft distinctions). Once in the combustor, the compressed air is guided by a flow annulus formed about an interior chamber toward the forward end of the combustor, where the air flow enters the interior chamber and, reversing it direction of flow, travels toward the aft end of the combustor. In yet another context, coolant flows through cooling passages may be treated in the same manner.

Additionally, given the configuration of compressor and turbine about a central common axis, as well as the cylindrical configuration common to many combustor types, terms describing position relative to an axis may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis. Finally, the term "circumferential" refers to movement or position around an axis. As mentioned, while these terms may be applied in relation to the common central axis that extends through the compressor and turbine sections of the engine, these terms also may be used in relation to other components or subsystems of the engine. For example, in the case of a cylindrically shaped combustor, which is common to many gas turbine machines, the axis which gives these terms relative meaning is the longitudinal central axis that extends through the center of the cross-sectional shape, which is initially cylindrical, but transitions to a more annular profile as it nears the turbine.

FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbines 10 may be configured with an axial compressor 11 that is mechanically coupled by a common shaft or rotor to a downstream turbine section or turbine 12, and a combustor 13 positioned between the compressor 11 and the turbine 12.

Figure 2:
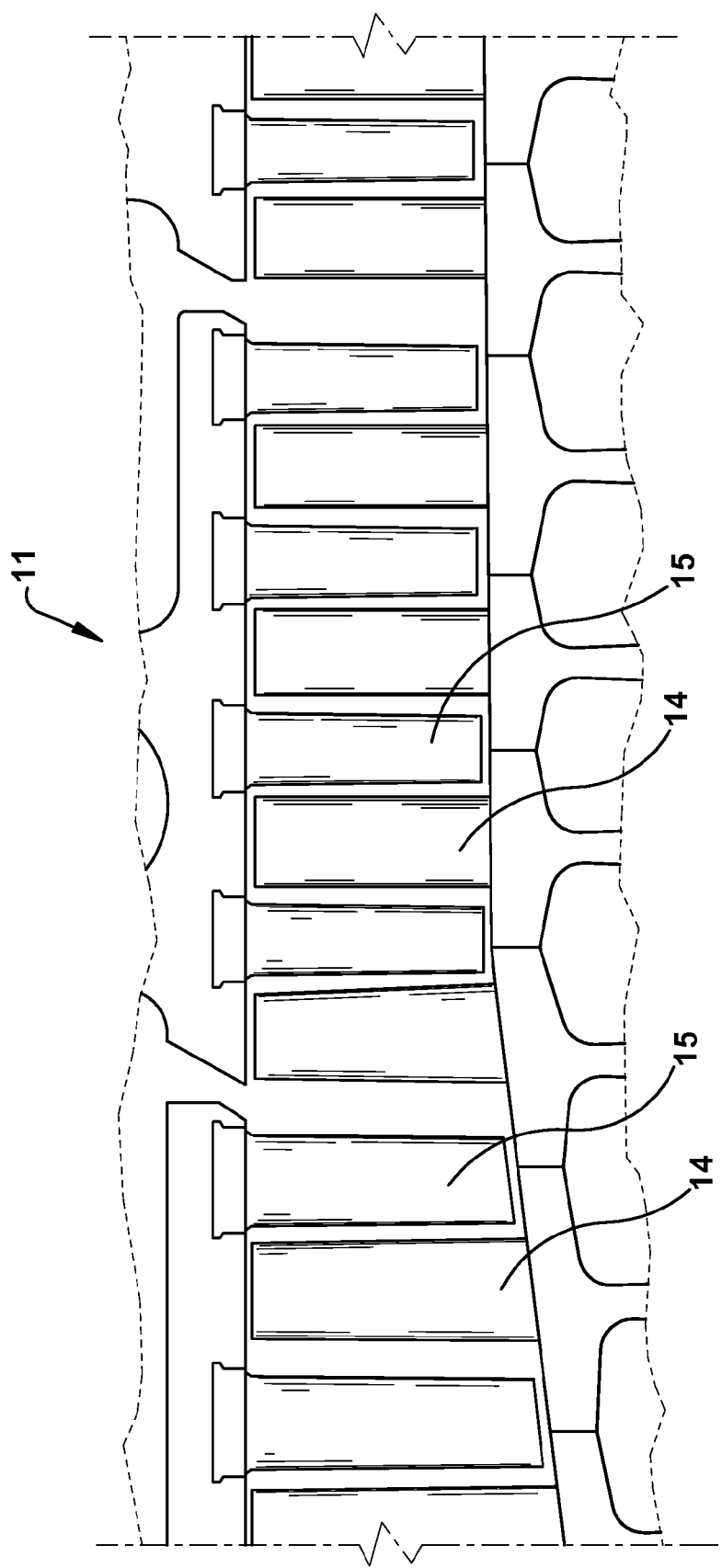
FIG. 2 is a sectional view of the compressor section of the combustion turbine engine of FIG. 1.

FIG. 2 illustrates a view of an exemplary multi-staged axial compressor 11 that may be used in the gas turbine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

Figure 3:
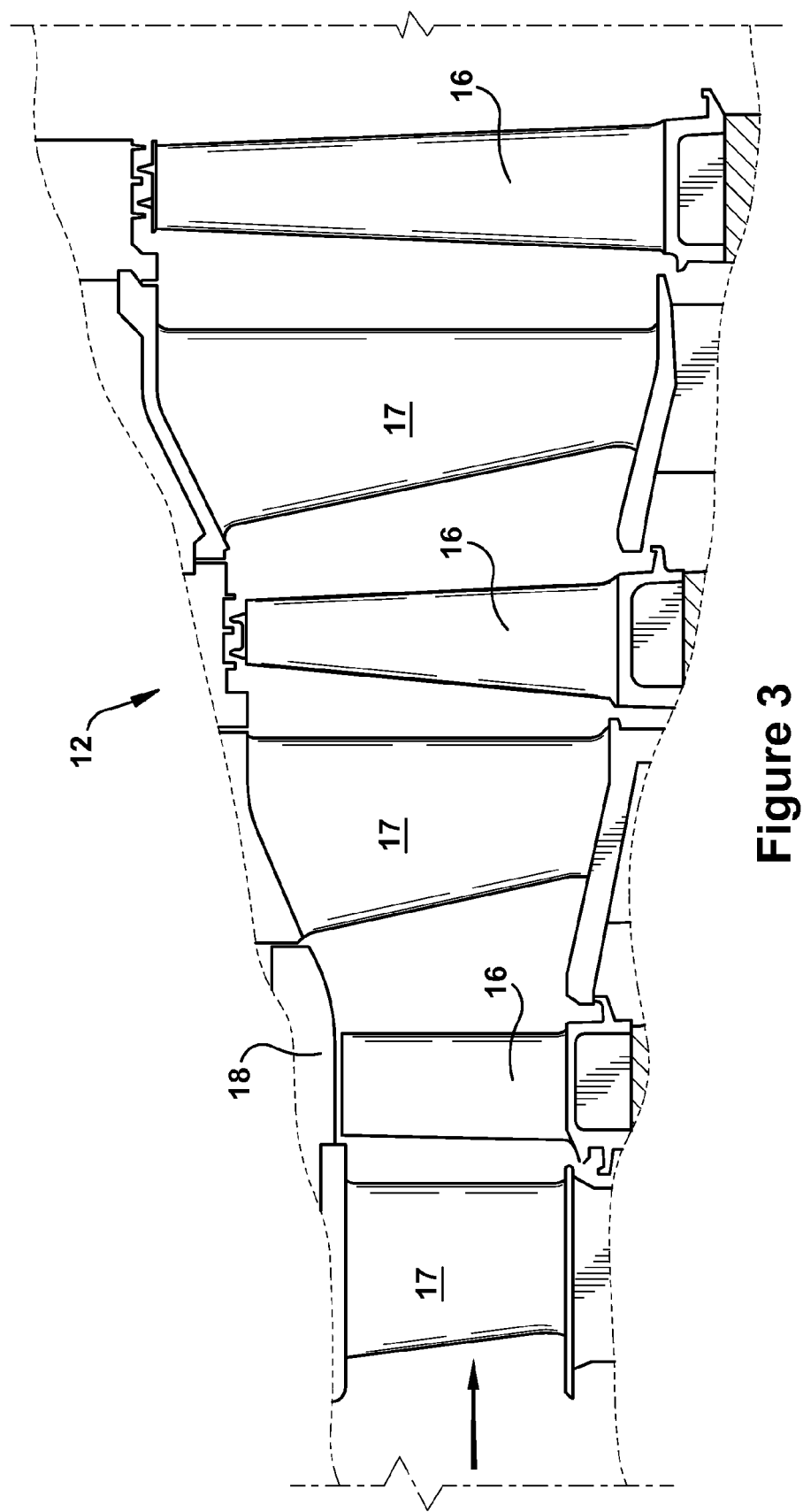
FIG. 3 is a sectional view of the turbine section of the combustion turbine engine of FIG. 1.

FIG. 3 illustrates a partial view of an exemplary turbine section or turbine 12 that may be used in the gas turbine of FIG. 1. The turbine 12 may include a plurality of stages. Three exemplary stages are illustrated, but more or less stages may be present in the turbine 12. A first stage includes a plurality of turbine buckets or rotor blades 16 ("rotor blades"), which rotate about the shaft during operation, and a plurality of nozzles or stator blades ("stator blades") 17, which remain stationary during operation. The stator blades 17 generally are circumferentially spaced one from the other and fixed about the axis of rotation. The rotor blades 16 may be mounted on a turbine disc or wheel (not shown) for rotation about a shaft. A second stage of the turbine 12 also is illustrated. The second stage similarly includes a plurality of circumferentially spaced stator blades 17 followed by a plurality of circumferentially spaced rotor blades 16, which are also mounted on a turbine wheel for rotation. A third stage also is illustrated, and similarly includes a plurality of stator blades 17 and rotor blades 16. It will be appreciated that the stator blades 17 and rotor blades 16 lie in the hot gas path of the turbine 12. The direction of flow of the hot gases through the hot gas path is indicated by the arrow. As one of ordinary skill in the art will appreciate, the turbine 12 may have more, or in some cases less, stages than those that are illustrated in FIG. 3. Each additional stage may include a row of stator blades 17 followed by a row of rotor blades 16.

In one example of operation, the rotation of compressor rotor blades 14 within the axial compressor 11 may compress a flow of air. In the combustor 13, energy may be released when the compressed air is mixed with a fuel and ignited. The resulting flow of hot gases from the combustor 13, which may be referred to as the working fluid, is then directed over the rotor blades 16, the flow of working fluid inducing the rotation of the rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
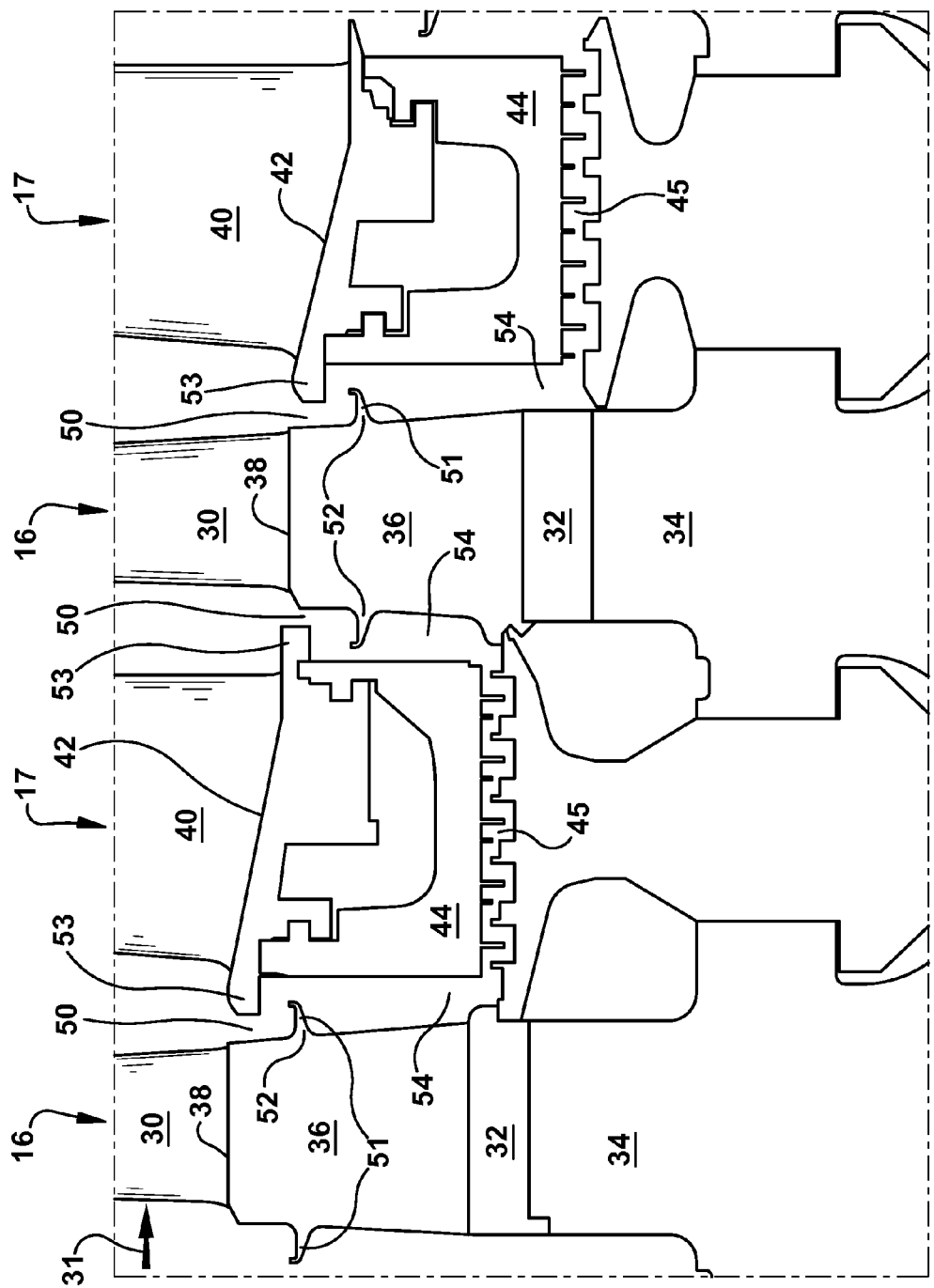
FIG. 4 is a schematic sectional view of the inner radial portion of several rows of rotor and stator blades according to certain aspects of the present invention.

FIG. 4 schematically illustrates a sectional view of the several rows of blades as they might be configured in a turbine according to certain aspects of the present application. As one of ordinary skill in the art will appreciate, the view includes the inboard structure of two rows of rotor blades 16 and stator blades 17. Each rotor blade 16 generally includes an airfoil 30 that resides in the hot-gas path and interacts with the working fluid of the turbine (the flow direction of which is indicated by arrow 31), a dovetail 32 that attaches the rotor blade 16 to a rotor wheel 34, and, between the airfoil 30 and the dovetail 32, a component that is typically referred to as the shank 36. As used herein, the shank 36 is meant to refer to the section of the rotor blade 16 that resides between the attachment means, which in this case is the dovetail 32, and the airfoil 30. The rotor blade 16 may further include a platform 38 at the connection of the shank 36 and the airfoil 30. Each stator blade 17 generally includes an airfoil 40 that resides in the hot-gas path and interacts with the working fluid and, radially inward of the airfoil 40, an inner sidewall 42 and a diaphragm 44. Typically, the inner sidewall 42 is integral to the airfoil 40 and forms the inner boundary of the hot-gas path. The diaphragm 44 typically attaches to the inner sidewall 42 (though may be formed integral therewith) and extends in an inward radial direction to form a seal 45 with rotating components positioned just inboard of it.

It will be appreciated that axial gaps are present between rotating and stationary components along the radially inward edge or inboard boundary of the hot-gas path. These gaps, which will be referred to herein as "trench cavities 50", are present because of the space that must be maintained between the rotating parts (i.e., the rotor blades 16) and the stationary parts (i.e., the stator blades 17). Because of the way the engine warms up and operates at different load levels, as well as, the differing thermal expansion coefficients of some of the components, the width of the trench cavity 50 (i.e., the axial distance across the gap) generally varies. That is, the trench cavity 50 may widen and shrink depending on the way the engine is being operated. Because it is highly undesirable for the rotating parts to rub against stationary parts, the engine must be designed such that at least some space is maintained at the trench cavity 50 locations during all operating conditions. This generally results in a trench cavity 50 that has a narrow opening during some operating conditions and a relatively wide opening during other operating conditions. Of course, a trench cavity 50 with a relatively wide opening is undesirable because it invites the ingestion of more working fluid into the turbine wheelspace.

It will be appreciated that a trench cavity 50 generally exists at each point along the radially inward boundary of the hot-gas path where rotating parts border stationary parts. Thus, as illustrated, a trench cavity 50 is formed between the trailing edge of the rotor blade 16 and the leading edge of the stator blade 17, and between the trailing edge of the stator blade 17 and the leading edge of the rotor blade 16. Typically, in regard to the rotor blades 16, the shank 36 defines one edge of the trench cavity 50, and, in regard to the stator blades 17, the inner sidewall 42 or other similar components, define the other edge of the trench cavity 50. Axial projections 51, which will be discussed in more detail below, may be configured within the trench cavity 50 so to provide a tortuous path or seal that limits ingestion of working fluid. Axial projections 51 may be defined as radially thin extensions that protrude from the inboard structure or faces of the rotor blades 16 and stator blades 17 that are opposed across the trench cavity 50. The axial projections 51, as will be appreciated, may be included on each of the blades 16, 17 so that they extend substantially circumferentially about the turbine. As shown, the axial projections 51 may include so called "angel wing" projections 52 that extend from the inboard structure of the rotor blades 16. Outboard of the angel wing projections 52, as illustrated, the inner sidewall 42 of the stator blade 17 may project toward the rotor blade 16, thereby forming a stator overhang 53 that overhangs or is cantilevered over a portion of the trench cavity 50. Generally, inboard of the angel wing 52, the trench cavity 50 is said to transition into a wheelspace cavity 54.

As stated, it is desirable to prevent the working fluid of the hot-gas path from entering the trench cavity 50 and the wheelspace cavity 54 because the extreme temperatures may damage the components within this area. The axially overlapping angel wing 52 and the stator overhang 53 may be configured so to limit some ingestion. However, because of the varying width of the trench cavity 50 opening and the limitations of such seals, working fluid may be regularly ingested into the wheelspace cavity 54 if the cavity were not purged with a relatively high level of compressed air bled from the compressor. As stated, because purge air negatively affects the performance and efficiency of the engine, its usage should be minimized.

Figure 5:
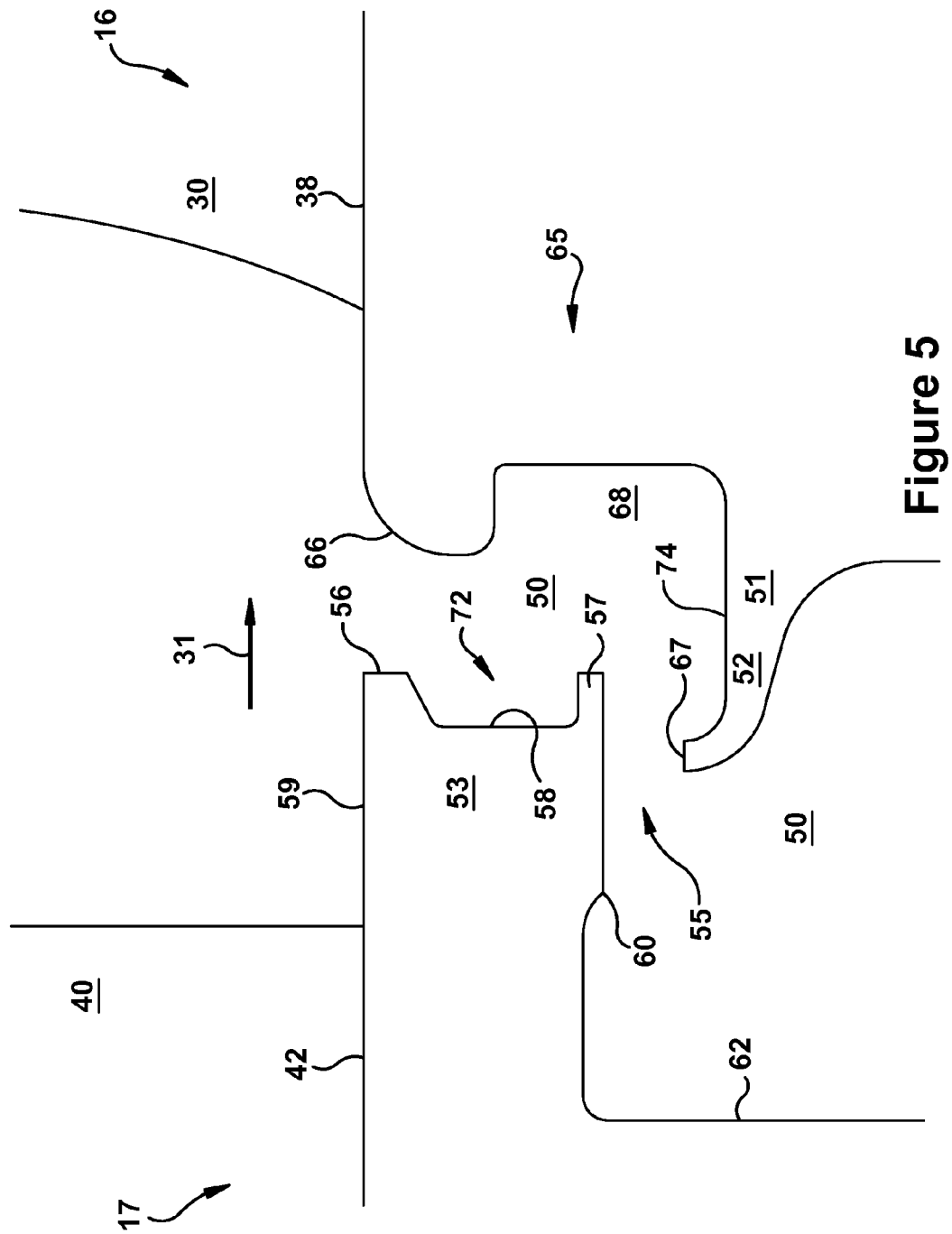
FIG. 5 is a sectional view of a trench cavity sealing arrangement assembly according to an exemplary embodiment of the present invention.
Figure 6:
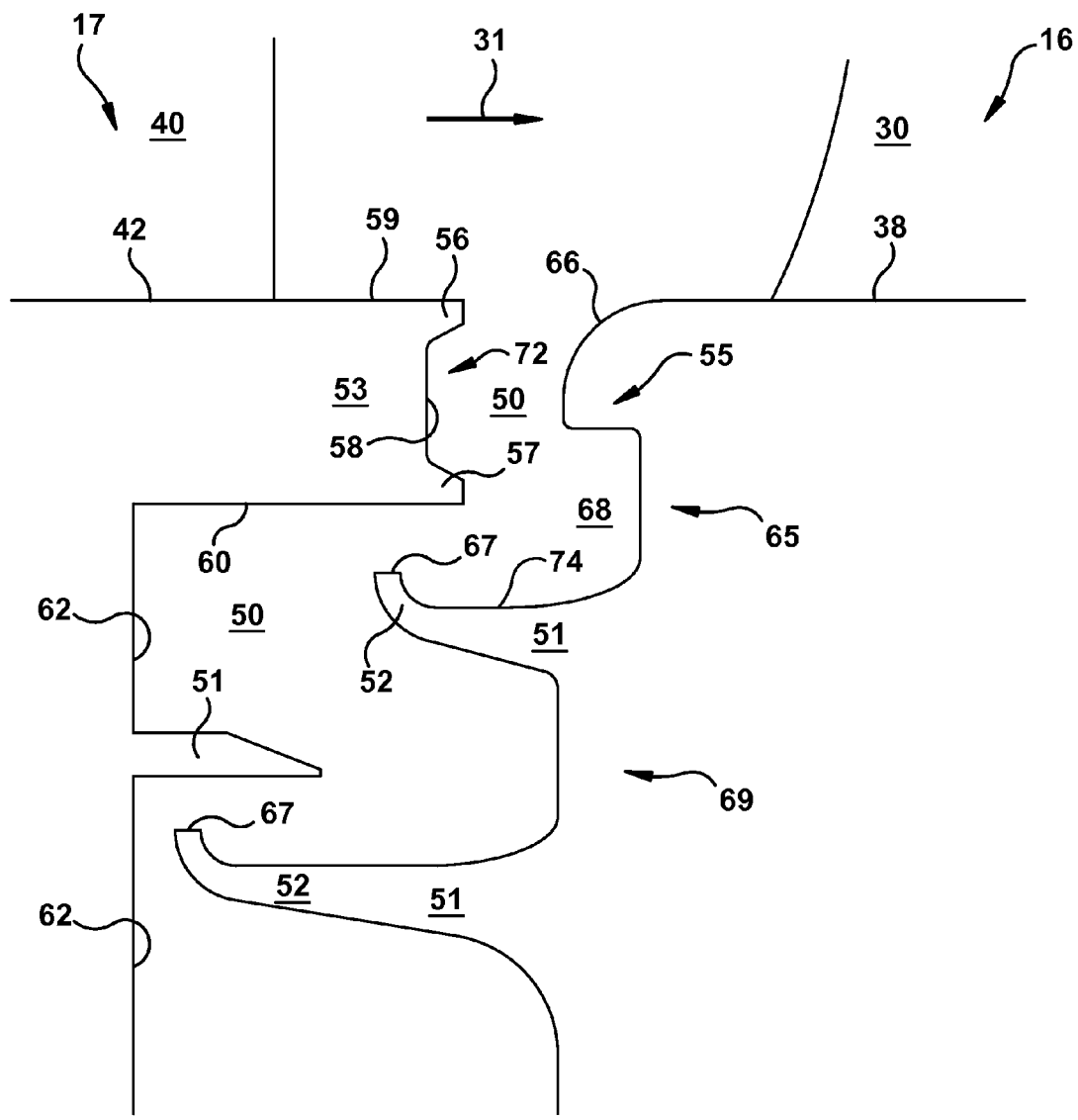
FIG. 6 is a sectional view of a trench cavity sealing arrangement assembly according to an alternative embodiment of the present invention.

FIGS. 5 through 6 provide sectional views of a trench cavity seal 55 according to embodiments of the present invention. As will be appreciated, the described embodiments include specific geometrical arrangements of several sealing component types that achieve a cost-effective and efficient sealing solution. As applicants have discovered, arranged in the manner described and claimed in the appended claim set, these components act together to create beneficial flow patterns that provide significant sealing benefits without the overreliance on purge air, which, as stated, enhances overall engine efficiency. Further, the arrangements described herein accomplished sealing objectives without the restrictive interlocking and complex configurations that increase maintenance costs and machine downtime. More specifically, the axial overlap between the stator blade assemblies and the rotor blade assemblies across the trench cavity is configured so to allow inboard drop-in installation of the stator blade assemblies relative to an already installed row or rows of neighboring rotor blades. The seal 55, according to preferred embodiments, may include outboard sealing structure positioned on the stator blade assemblies that axially overlaps inboard sealing structure positioned on the rotor blade assemblies, but, as will be appreciated upon inspection of FIGS. 5 and 6, does not interlock therewith so to hinder or prevent the drop-in installation of the stator blades. Additionally, as part of the discussion related to FIGS. 7 through 10, the present application will discuss embodiments that enhance trench cavity sealing through the usage of an air current, that, according to preferred embodiments, works in tandem with internal cooling passages within the stator blade as well as other aspects of the sealing configurations discussed herein.

As illustrated in FIG. 5, the stator blade 17 may include a stator overhang 53 that extends from the stator blade 17 toward the rotor blade 16. The stator overhang 53 may include an outboard edge 56 and an inboard edge 57 and, defined therebetween the outboard edge 56 and the inboard edge 57, an overhang face 58. The outboard edge 56 may be positioned at the inner boundary of a flowpath through the turbine. As mentioned, the stator overhang 53 may include a portion of the sidewall 42 and define a portion of the inner boundary of flowpath. This outer surface of the stator overhang 53 will be referred to as an overhang topside 59. Opposite the overhang topside 59, the stator overhang 53 includes an overhang underside 60 that extends axially from the inboard edge 57 of the stator overhang 53 to a stator inboard face 62, which is a radially extending internal wall that defines a portion of the trench cavity 50. As already described, the rotor blade 16 may include a rotor outboard face 65 that extends radially inboard from a platform edge 66 of the platform 38. The platform edge 66 may be positioned at the inner boundary of the flowpath through the turbine. The rotor outboard face 65, as shown, may oppose the overhang face 58 across the axial gap of the trench cavity 50. An outer radial or first axial projection 51 may extend from the rotor outboard face 65 toward the stator blade 17. As illustrated, the first axial projection 51 may be positioned inboard relative to the stator overhang 53. The stator overhang 53 and the first axial projection 51 may be configured such that the stator overhang 53 axially overlaps the first axial projection 51. In this manner, the stator overhang 53 may overhang at least a tip 67 of the first axial projection 51.

As depicted, the first axial projection 51 may be configured as an angel wing projection 52. The angel wing projection 52 may be configured to include an upturned, concave lip at the tip 67. The rotor outboard face 65 may include a pocket 68 defined between an overhanging nose portion of the platform, as illustrated, and the first axial projection 51. According to a preferred embodiment, the inboard edge 57 of the stator overhang 53 may be configured to include and axially jutting edge. As illustrated, the axially jutting edge of the inboard edge 57 may be configured so to radially overlap with the radial height of the pocket 68 of the rotor outboard face 65. More preferably, the jutting edge of the inboard edge 57 may be configured so to radially coincide with a radial midpoint region of the pocket 68 of the rotor outboard face 65, as illustrated. In this manner, the structures may cooperate so to induce multiple switch-back flow patterns that limits hot gas ingestion and creates an effective trench cavity seal. In addition, the outboard edge 56 of the stator overhang 53 may be configured so to also include an axially jutting edge, so that, along with the inboard jutting edge 57, a recessed portion 72 of the overhang face 58 is formed. Preferably, an outboard edge of the pocket 68 of the rotor outboard face 65 is position so to radially overlap the recessed portion 72 of the overhang face 58. As illustrated, the outboard edge 56 of the pocket 68 of the rotor outboard face 65 may be positioned so to radially coincide with a radial midpoint region of the recessed portion of the overhang face 58.

As illustrated in FIG. 6, the rotor blade 16 may include a rotor inboard face 69 that extends inboard from the rotor outboard face 65. As will be appreciated, the rotor inboard face 69 may be configured to oppose the stator inboard face 62 across the axial gap of the trench cavity 50. As illustrated, the rotor inboard face 69 may include an inner radial or second axial projection 51 extending therefrom toward the stator blade 17. The stator overhang 53 and the second axial projection 51 of the rotor blade may be configured so to axially overlap. Similar to the first axial projection 51, the second axial projection 51 may be configured as an angel wing projection 52 that includes an upturned lip at the tip 67. As illustrated, the second axial projection 51 may have a longer axial length than the first axial projection 51.

According to a preferred embodiment, the stator inboard face 62 may include an axial projection 51 that extends therefrom toward the rotor blade 16. The axial projection 51 of the stator blade 17 and the second axial projection 51 of the rotor blade 16 may be configured so to axially overlap. More specifically, the second axial projection 51 of the rotor blade 16 may be configured just inboard of the axial projection 51 of the stator blade 17 such that the axial projection 51 of the stator blade 17 overhangs at least the tip 67 of the second axial projection 51 of the rotor blade 16. As will be appreciated, the trench cavity 50 of FIGS. 5 and 6 provides an example, given the indicated direction of flow 31 through the flowpath, where the trench cavity 50 is formed between the upstream side of the rotor blade 16 and the downstream side of the stator blade 17. It should be realized that alternative embodiments of the present invention include cases where the trench cavity 50 is formed between the downstream side of the rotor blade 16 and an upstream side of the stator blade 17.

FIGS. 7 through 10 are sectional views of a trench cavity configuration having a sealing arrangement 55 that includes an air curtain assembly in accordance with exemplary embodiments of the present invention. As shown, the exemplary trench cavity seals 55 of these configurations may include many of the same sealing components already described. That is, in preferred embodiments, the stator overhang 53, as described above, extends toward the rotor blade 16 so to overhang an axial projection 51 that projects from the rotor blade 16. As previously discussed, the axial projection 51 may be configured as an angel wing projection 52 that extends from the rotor outboard face 65 toward the stator blade 17. As part of the seals 55 of FIGS. 7 through 10, one or more ports 73 may be disposed on the overhang underside 60 of stator overhang 53. The ports 73 may be configured to aim coolant toward the axial projection 51. More specifically, as illustrated, the port 73 may be configured to train a fluid expelled from the port 73 onto the outboard surface 74 of the angel wing 52. As discussed more fully in regards to the embodiments of FIGS. 9 and 10, the outboard surface 74 of the angel wing 52 may be configured to receive the fluid expelled from the port 73 and deflect it in a desired way, such as toward the inlet 76 of the trench cavity 50, so to resist the ingestion of hot gases.

Figure 7:
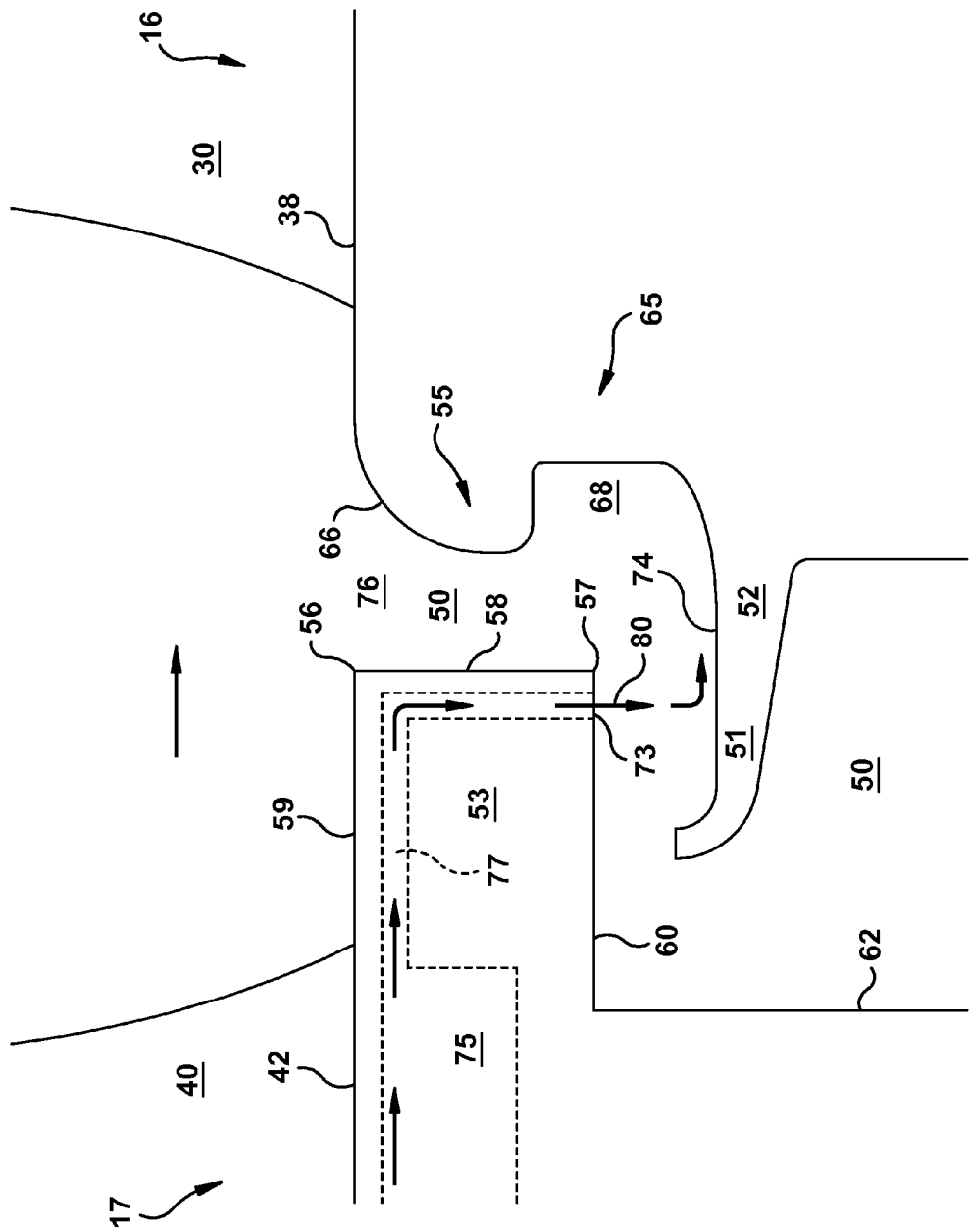
FIG. 7 is a sectional view of a trench cavity that includes a sealing arrangement with air curtain assembly according to an exemplary embodiment of the present invention.
Figure 8:
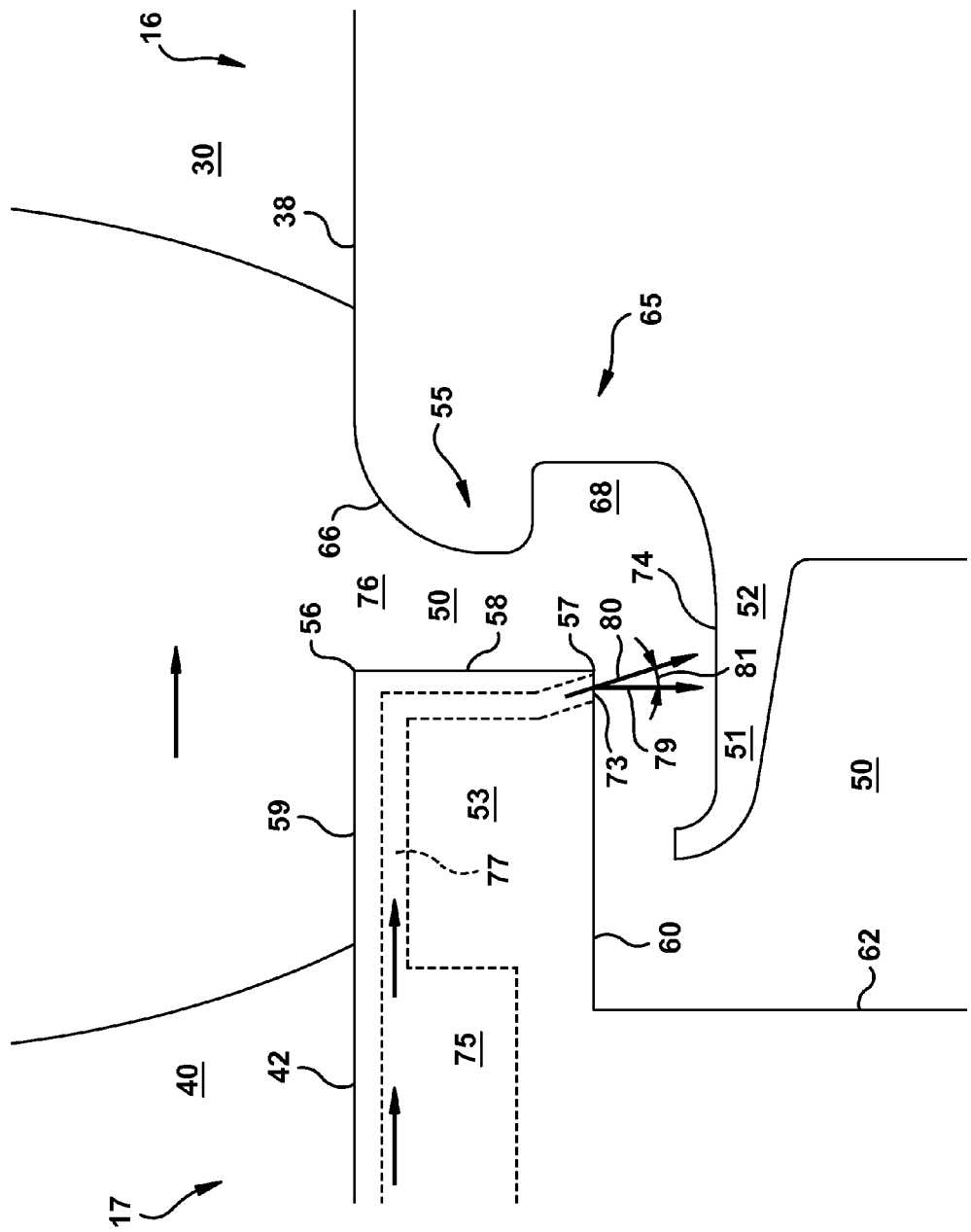
FIG. 8 is a sectional view of a trench cavity that includes a sealing arrangement with air curtain assembly according to an alternative embodiment of the present invention.
Figure 9:
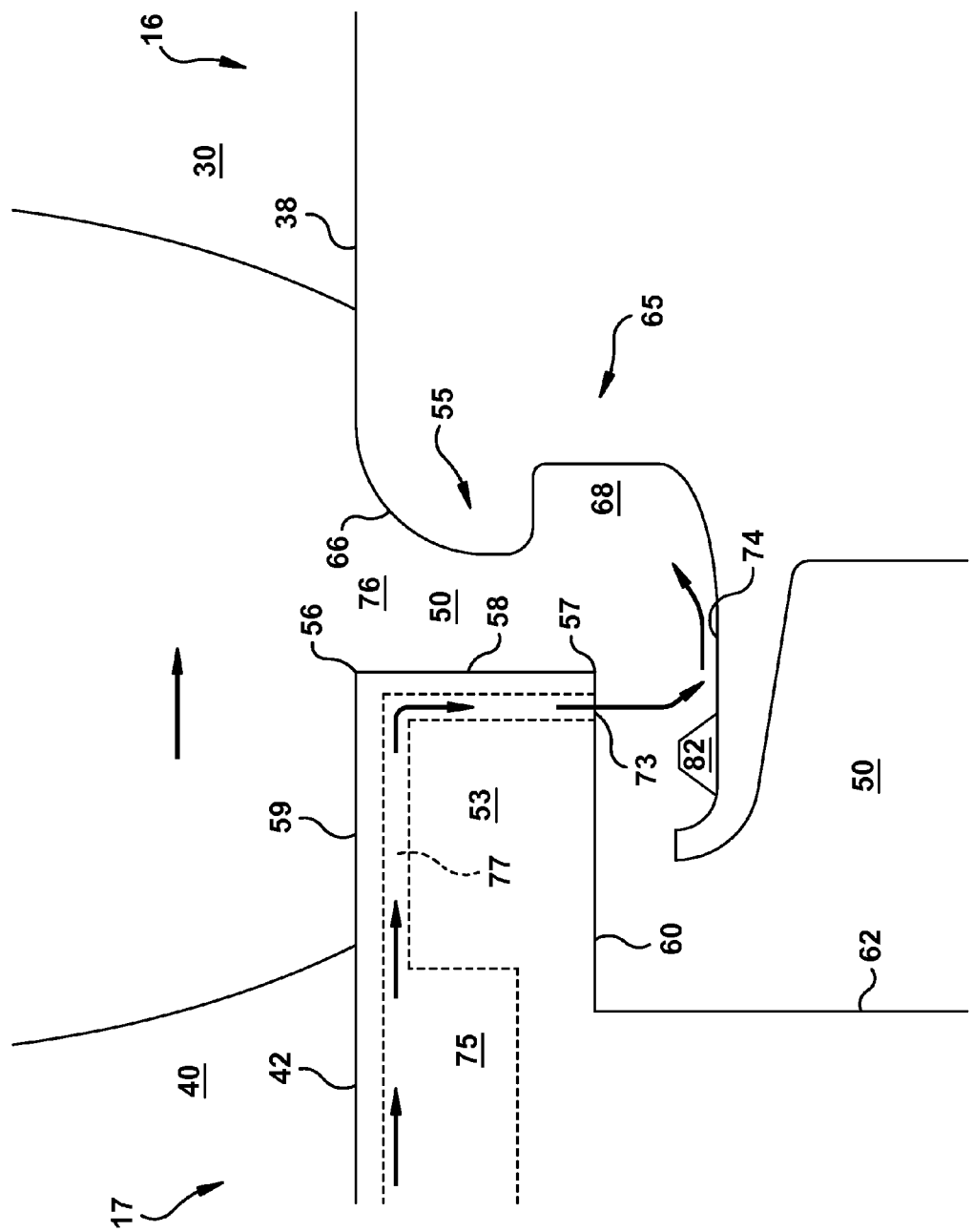
FIG. 9 is a sectional view of a trench cavity that includes a sealing arrangement with air curtain assembly according to an alternative embodiment of the present invention.

The fluid expelled by the port 73 may be a coolant, which, typically, is compressed air bled from the compressor. As shown, the port 73 may be configured to fluidly communicate with a coolant source, such as coolant plenum 75, via one or more interior cooling channels 77 that are formed within the stator blade 17. The interior cooling channels 77 may be formed through the stator overhang 53. As will be appreciated, the coolant plenum 75 may take many configurations. The coolant plenum 75 may be configured to circulate coolant through the stator blade 17 from a coolant source, which may be an interior passage formed through the airfoil 40. The cooling channels 77, according to a preferred embodiment as shown in FIGS. 7 through 9, may be configured to extend just below the surface of the overhang topside 59 and/or the overhang face 58 before reaching the port 73. As will be appreciated, the surface areas designated as the overhang topside 59 and the overhang face 58 are regions that require high levels of active interior cooling. By bringing the coolant that is eventually discharged through the port 73 very close to the surfaces within these regions, the coolant is efficiently utilized for convectively cooling these surface areas, via moving through the cooling channels 77, and resisting hot gas ingestion, via the discharge of the cooling through port 73. According to exemplary embodiments, the cooling channels 77 may be configured as multiple parallel interior channels that are closely spaced at regular circumferential intervals about the turbine.

As shown in FIG. 8, the port 73 may be canted in the axial direction (instead of the radial direction of FIG. 7) so to enhance certain aspects of performance. The direction of the angle may be toward the inlet 76 of the trench cavity 50 so to form a more direct air curtain against ingestion. More specifically, referring to an inboard trained reference line 79 (i.e., that represents a line originating at the port 73 and then extends in the inboard direction toward the axis of the turbine), the port 73 is axially canted such that a direction of discharge ("discharge direction") 80 from the port 73 creates a discharge angle 81 relative to the inboard trained reference line 79. A positive angle being one aimed away from the stator inboard face. According to certain embodiments, the discharge angle 81 may be between 20 and 60°. As stated, the ports 73 may have no axial cant, thereby having a discharge direction 80 that is substantially the same as the inboard aimed reference line 79. According to preferred embodiments, the discharge may also have a swirl component in the rotational direction by orienting the outlet ports 73 of channels 77 in the circumferential direction.

Figure 10:
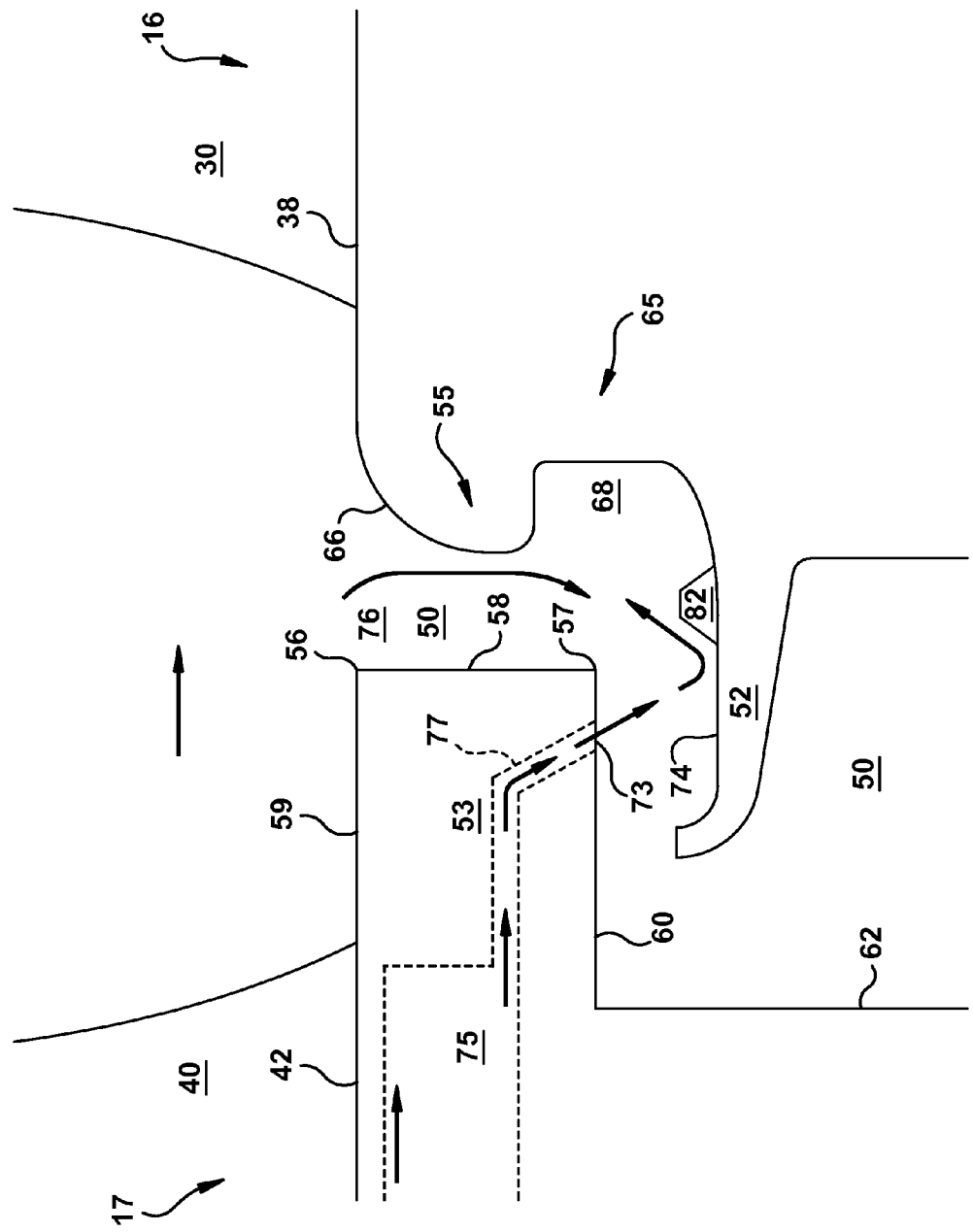
FIG. 10 is a sectional view of a trench cavity that includes a sealing arrangement with air curtain assembly according to an alternative embodiment of the present invention.

According to other embodiments, as illustrated in FIGS. 9 and 10, the angel wing projection 52 may be configured to include deflecting structure 82 that is configured so to deflected the coolant from the port 73 in a desirable way. The deflecting structure 82, as illustrated in FIGS. 9 and 10, may be positioned along the outboard surface 74 of the axial projection 51, and may protrude therefrom. According to preferred embodiments, the deflecting structure 82 includes an oblique surface for directing the coolant toward the inlet 76 of the trench cavity 50. For example, as illustrated in FIG. 9, the deflecting structure 82 may include a deflecting surface that is obliquely oriented relative the outboard surface 74 of the axial projection 51 so to deflect the radially aligned discharge of coolant from the port 73 on and more axial flow path along the outboard surface 74. The direction of the reflection may be in the direction of the inlet 76 of the trench cavity. As illustrated in FIG. 10, in an alternative embodiment, the deflecting structure may include structure that reflects the discharge more directly toward the inlet 76, i.e., in a more vertical or radial direction.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A gas turbine comprising a turbine including a stator blade and a rotor blade having a seal formed in a trench cavity defined therebetween, the trench cavity comprising an axial gap defined between opposing inboard faces of the stator blade and rotor blade, the seal comprising:
   a stator overhang extending from the stator blade toward the rotor blade so to include an overhang topside that defines a portion of the inner boundary of the flowpath, and, opposite the overhang topside, an overhang underside;
   a rotor outboard face extending radially inboard from a platform edge, the rotor outboard face opposing at least a portion of the stator overhang across the axial gap of the trench cavity;
   an axial projection extending from the rotor outboard face toward the stator blade so to axially overlap with the stator overhang; and
   an interior cooling channel extending through the stator overhang to a port formed through the overhang underside;
   wherein the port is configured to direct a coolant expelled therefrom toward the axial projection;
   wherein the axial projection comprises an inboard position relative to the stator overhang;
   wherein the port is configured to direct the coolant expelled therefrom toward an outboard surface of the axial projection;

wherein the axial projection comprises a radially narrow rigid structure that extends axially from a connection made to the rotor outboard face;

wherein the overhang underside includes an outboard edge and an inboard edge and, defined therebetween, an overhang face;

wherein the overhang underside extends axially from the inboard edge of the stator overhang to a radially extending stator inboard face;

wherein an inboard trained reference line comprises a line originating at the port and then extends in the inboard direction directly toward the axis of the gas turbine;

wherein a discharge direction comprises a direction in which the port is aimed;

wherein a discharge angel angle comprises an angle formed between the inboard trained reference line and the discharge direction;

further comprising deflecting structure disposed on the outboard surface of the axial projection;

wherein the discharge direction from the port comprises a direction toward the deflecting structure for deflecting the coolant therefrom in a predefined direction.

2. The gas turbine according to claim 1, wherein the axial projection comprises an inboard position relative to the stator overhang such that the stator overhang overhangs at least a tip of first axial projection; and wherein the axial projection comprises an angel wing projection including an upturned lip at the tip.

3. The gas turbine according to claim 1, wherein the outboard edge comprises a position at an inner boundary of a flowpath through the turbine;

wherein a platform edge comprises a position at the inner boundary of the flowpath through the turbine; and wherein the rotor blade comprises a platform that axially extends from the platform edge so to define a portion of the inner boundary of the flowpath.

4. The gas turbine according to claim 1, wherein the discharge angle is approximately 0°.

5. The gas turbine according to claim 1, wherein the deflecting structure is configured to receive the fluid expelled from the port for deflection toward an inlet of the trench cavity.

6. The gas turbine according to claim 1, wherein the deflecting structure comprises a protrusion that juts radially from the outboard surface of the axial projection, and wherein the deflecting structure includes a deflecting surface.

7. The gas turbine according to claim 6, wherein the deflecting surface comprises an oblique configuration relative to the outboard surface of the axial projection.

8. The gas turbine according to claim 1, wherein the wherein the port comprises a discharge angle of between 20° and 60° aimed away from the stator blade.

9. The gas turbine according to claim 1, wherein the angel wing projection is disposed on an upstream side of the rotor blade and the port is disposed on the downstream side of the stator blade.

10. The gas turbine according to claim 1, wherein the angel wing projection is disposed on a downstream side of the rotor blade and the port is disposed on the upstream side of the stator blade.

11. The gas turbine according to claim 1, wherein the port comprises a discharge direction canted in opposition to a flow direction of ingested working fluid traveling from the inlet of the trench cavity to a wheelspace cavity.

12. The gas turbine according to claim 11, wherein the port is configured to fluidly communicate with an interior cooling channel formed through an interior of the stator overhang, the interior cooling channel comprising a connection to a coolant source extending through an airfoil of the stator blade.

13. A gas turbine comprising a turbine including a stator blade and a rotor blade having a seal formed in a trench cavity defined therebetween, the trench cavity comprising an axial gap defined between opposing inboard faces of the stator blade and rotor blade, the seal comprising:

a stator overhang extending from the stator blade toward the rotor blade so to include an overhang topside that defines a portion of the inner boundary of the flowpath, and, opposite the overhang topside, an overhang underside;

a rotor outboard face extending radially inboard from a platform edge, the rotor outboard face opposing at least a portion of the stator overhang across the axial gap of the trench cavity;

an axial projection extending from the rotor outboard face toward the stator blade so to axially overlap with the stator overhang; and an interior cooling channel extending through the stator overhang to a port formed through the overhang underside;

wherein the port is configured to direct a coolant expelled therefrom toward the axial projection;

wherein the axial projection comprises an inboard position relative to the stator overhang;

wherein the port is configured to direct the coolant expelled therefrom toward an outboard surface of the axial projection;

wherein the axial projection comprises a radially narrow rigid structure that extends axially from a connection made to the rotor outboard face;

wherein the overhang underside includes an outboard edge and an inboard edge and, defined therebetween, an overhang face;

wherein the overhang underside extends axially from the inboard edge of the stator overhang to a radially extending stator inboard face;

wherein an inboard trained reference line comprises a line originating at the port and then extends in the inboard direction directly toward the axis of the gas turbine;

wherein a discharge direction comprises a direction in which the port is aimed;

wherein a discharge angel angle comprises an angle formed between the inboard trained reference line and the discharge direction;

wherein the port comprises a discharge direction canted in opposition to a flow direction of ingested working fluid traveling from the inlet of the trench cavity to a wheelspace cavity; and wherein the port is configured to fluidly communicate with an interior cooling channel formed through an interior of the stator overhang, the interior cooling channel comprising a connection to a coolant source extending through an airfoil of the stator blade.

14. The gas turbine according to claim 13, wherein the cooling channel is configured to connect to a coolant plenum and extend parallel and in close proximity to the overhang topside.

15. The gas turbine according to claim 13, wherein the cooling channel is configured to extend parallel and in close proximity to the overhang face.

16. The gas turbine according to claim 13, wherein the cooling channel is configured to connect to a coolant plenum and extend parallel and in close proximity to the overhang topside;
  wherein, near the outboard edge of the stator overhang, the cooling channel comprises a turn toward the overhang underside; and
  wherein the is configured to extend parallel and in close proximity to the overhang face from the turn to the port.

17. The gas turbine seal according to claim 16, wherein the angel wing projection extends along a circumferential width of the rotor blade;
  wherein the stator overhang extends along a circumferential width of the rotor blade; and
  wherein the port comprises a plurality of discrete ports spaced at circumferential intervals along a circumferential width of the stator overhang.

\* \* \* \* \*